United States Patent
Chang et al.

(10) Patent No.: US 8,058,333 B1
(45) Date of Patent: Nov. 15, 2011

(54) FLAME RETARDING COMPOSITE MATERIAL

(75) Inventors: Chia-Chang Chang, Taoyuan County (TW); Wen-Sheng Wang, Taoyuan County (TW); Yu Wei Chang, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 0 days.

(21) Appl. No.: 12/947,202

(22) Filed: Nov. 16, 2010

(30) Foreign Application Priority Data

Jul. 23, 2010 (TW) ................................ 99124307 A

(51) Int. Cl.
*C08K 5/5399* (2006.01)
(52) U.S. Cl. ......................................................... 524/138
(58) Field of Classification Search .................. 524/122, 524/127, 138, 494
See application file for complete search history.

(56) References Cited

U.S. PATENT DOCUMENTS

| | | | | |
|---|---|---|---|---|
| 5,952,408 A | * | 9/1999 | Lee et al. | 524/127 |
| 5,969,016 A | * | 10/1999 | Weber et al. | 524/127 |
| RE36,902 E | * | 10/2000 | Eckel et al. | 524/127 |
| 6,437,029 B1 | * | 8/2002 | Lim et al. | 524/97 |
| 6,613,820 B2 | * | 9/2003 | Fujiguchi et al. | 524/109 |
| 6,686,404 B1 | * | 2/2004 | Eckel et al. | 524/127 |
| 6,706,788 B2 | * | 3/2004 | Eckel et al. | 524/127 |
| 6,713,544 B2 | * | 3/2004 | Eckel et al. | 524/127 |
| 7,691,924 B2 | * | 4/2010 | Lim et al. | 524/95 |
| 7,799,855 B2 | * | 9/2010 | Ebeling et al. | 524/127 |
| 2002/0099116 A1 | * | 7/2002 | Nodera et al. | 524/127 |
| 2002/0137822 A1 | * | 9/2002 | Seidel et al. | 524/127 |
| 2007/0213437 A1 | * | 9/2007 | Nagatoshi | 524/146 |
| 2008/0290331 A1 | | 11/2008 | Wang | |
| 2011/0003918 A1 | * | 1/2011 | Eckel et al. | 524/127 |
| 2011/0034587 A1 | * | 2/2011 | Lee et al. | 523/220 |

* cited by examiner

*Primary Examiner* — Peter Szekely

(74) *Attorney, Agent, or Firm* — Rosenberg, Klein & Lee

(57) ABSTRACT

A flame retarding composite material includes at least a PC resin, an ABS resin, a flame retardant having a P=X double bond, and an additive. The PC resin in the composite material is in the range of 60 wt % to 80 wt %. The ABS resin in the composite material is in the range of 15 wt % to 35 wt %. The additive can includes 5 wt % to 37 wt % of glass fiber.

6 Claims, No Drawings

FLAME RETARDING COMPOSITE MATERIAL

BACKGROUND OF THE INVENTION

1. Field of the Invention

The present invention relates to a flame retarding composite material, and especially to a flame retarding composite material which contains a flame retardant having a P=X double bond.

2. Description of Related Art

In the case of using an inorganic flame retardant in a composite material, it needs great amount to get the desired effect, which may significantly increase the total cost. Furthermore, the addition of the inorganic flame retardant would deteriorate the inherent mechanic properties. Therefore there are many limitations for using inorganic flame retardant. Halogen has been widely used for flame retarding application, as disclosed in US published patent US 2008/0290331 for example. However, due to the increasingly attention on environmental protection issue, many consumer electronic products have shunned away from using halogen-containing material.

Therefore, there is a need of a composite material having an appropriate flame retardant to enhance fire-proof property, while meeting the requirement of mechanic strength for engineering material used in the consumer products.

SUMMARY OF THE INVENTION

The object of the present invention is to provide a flame retarding composite material in which a flame retardant having a P=X double bond is added into a PC/ABS composite material, so as to increase heat resistance and flame retardancy of the PC/ABS composite material. A glass fiber is further added to the PC/ABS composite material to maintain the mechanic property.

It is another object of the invention to provide a flame retarding composite material in which a small amount of phosphorus is added to provide fireproof/flame retardance effect, saving the production cost.

In order to achieve the aforementioned objects, according to an embodiment of the present invention, the flame retarding composite material includes a polycarbonate (PC) resin, a acrylonitrile butadiene styrene (ABS) resin, a phosphorus-containing flame retardant having a P=X double bond, and an additive. The amount of polycarbonate resin based on the composite material is 60 wt % to 80 wt %, the amount of acrylonitrile butadiene styrene resin based on the composite material is 15 wt % to 35 wt %, the amount of the phosphorus-containing flame retardant is 10 wt % to 20 wt %, and the amount of glass fiber based on the composite material is 5 wt % to 37 wt %. All the components are subject to distributive mixing to form the target composite material.

In one example, the phosphorus-containing flame retardant is any compounds of the following formula or any derivatives thereof, in weight percentage of 10% to 20%;

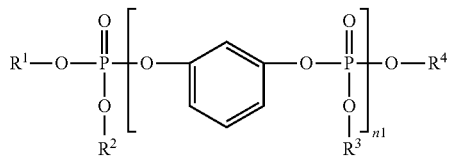

where n1 is 1 to 5; $R^1$, $R^2$, $R^3$, $R^4$ are respectively selected from alkyl of C1 to C4, aryl, or naphthyl.

In another example, the phosphorus-containing flame retardant is any compounds of the following formula or any derivatives thereof, in weight percentage of 12.5% to 15%:

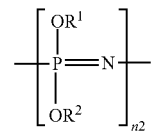

where n2 is 1 to 10; $R^1$ and $R^2$ are respectively selected from alkyl of C1 to C4, cycloalkyl of C6 to C8 or, aryl.

This invention offers the following advantages: with the use of the phosphorus-containing flame retardant having a P=X double bond, the polyphosphoric acid will react with oxygen (O) or hydroxyl (OH) in the composite material when heating, so that the plastic material is esterified dehydration to form a carbon layer which provides fireproof/flame retardant effect.

On the other hand, the above glass fiber can effectively enhance the mechanic strength and aging resistance.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

This invention relates to a flame retarding composite material in which a phosphorus-containing flame retardant is added into a mixture of polycarbonate resin and acrylonitrile butadiene styrene copolymer resin. The amount of the phosphorus-containing flame retardant relative to the mixture is controlled to be in a pre-determined range in term of cost control and balance between the cost and heat resistance. On the other hand, additives such as glass fiber can be further added to enhance the mechanic property of the composite material.

The flame retarding composite material of the invention includes the following components: (A) a first resin which can be polycarbonate (PC) resin, in the weight percentage of 60 wt % to 80 wt % based on the composite material; (B) a second resin which can be acrylonitrile butadiene styrene (ABS) resin, in the weight percentage of 15 wt % to 35 wt % based on the composite material; (C) a phosphorus-containing flame retardant having a P=X double bond, where X can be O or N; and (D) an additive. All the components are subject to distributive mixing to form the target composite material.

The P=X double bond of the phosphorus-containing flame retardant of the composite material according to the invention grants improved fireproof or flame retardance to the mixture of polycarbonate resin and acrylonitrile butadiene styrene copolymer resin. Two exemplary compounds are specifically provided here for exemplifying the fireproof or flame retardance due to the action of the double bond P=X as recited above.

Example 1

In Example 1, the component (A) is a polycarbonate resin which has compounds having a structure as shown in the following formula 4 or any derivatives thereof:

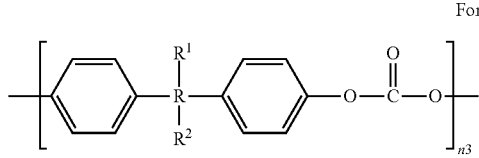

Formula 4

Where n3 is numeral of 50 to 500; R is selected from alkyl of C1-C4, selected from alkenyl of C1-C7, selected from cycloalkyl of C6-C8, selected from phenyl of C6-C12, selected from oxygen, nitrogen, or sulfur; $R^1$, $R^2$ is hydrogen, or selected from straight-chain alkyl of C1-C5, branched-chain alkyl of C1-C5, or phenyl of C6-C12. Specifically, the component (A), the first resin, can be straight-chain (linear) polycarbonate resin, such as: 4,4'-(pentane-1,5-diyl)diphenol, 4,4'-(butane-1,4-diyl)diphenol, 4,4'-(propane-1,3-diyl)diphenol, 4,4'-(pentane-1,1-diyl)diphenol. Alternatively, the component (A), the first resin, can be branched polycarbonate resin, such as: 4,4'-(2,2,4,4-tetramethylpentane-3,3-diyl)diphenol, 4,4'-(4-ethylheptane-3,5-diyl)diphenol, 4,4'-(3,6-dimethyloctane-4,5-diyl)diphenol), 4,4'-(cyclohexylmethylene)diphenol, or 4,4'-(phenylmethylene)diphenol. The respective chemical structures of the above compounds are shown as follows:

4,4'-(2,2,4,4-tetramethylpentane-3,3-diyl)diphenol 4,4'-(4-ethylheptane-3,5-diyl)diphenol 4,4'-(butane-1,4-diyl)diphenol 4,4'-(propane-1,3-diyl)diphenol 4,4'-(pentane-1,1-diyl)diphenol 4,4'-(phenylmethylene)diphenol However, considering the impact of the covalent bond energy of the combustion reaction and processing conditions, the polycarbonate resin preferably has a molecular weight of 10000 to 100000. The larger the molecular weight of the material, the bigger the covalent bond energy is, which makes oxides difficult to form in the course of oxidation reaction, i.e., the heat resistance is better. However, when the molecular weight exceeds 100000, processing problems sometimes occur. Furthermore, in order to illustrate the improvement in terms of flame retardance by means of the P═X double bond of the phosphorus-containing flame retardant, the linear polycarbonate resin which has inferior heat resistance is used in Example 1 of the invention. In other words, all of R, $R^1$, $R^2$ in the above formula of polycarbonate resin are straight-chain carbon structure.

The component (B), second component, is acrylonitrile butadiene styrene copolymer, which consists of compounds or their derivatives as shown in the following formula B-1, formula B-2, and formula B-3.

Formula B-1 is:

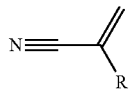

wherein the R is hydrogen, or selected from alkyl of C1-C4; formula B-1 can have the variety of:

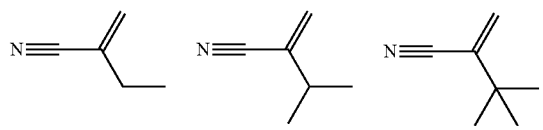

Formula B-2 is:

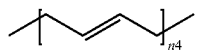

wherein n4 is a numeral of 250-3300; formula B-2 can have the variety of

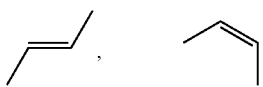

Formula B-3 is

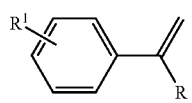

Wherein R is hydrogen or alkyl of C1-C7; R1 is methyl or halogen. Formula B-3 can have the variety of (3,3-dimethylbut-1-en-2-yl)benzene

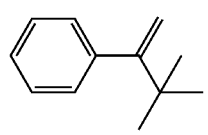

1-bromo-4-(prop-1-en-2-yl)benzene

1-methyl-4-vinylbenzene

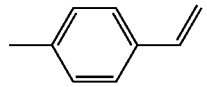

In particular, formula B-1 can be expressed as acrylonitrile or the derivatives thereof, such as methacrylonitrile, 2-methylenebutanenitrile, 3-methyl-2-methylenebutanenitrile, or 3,3-dimethyl-2-methylenebutanenitrile, etc. The weight percentage of the compound of formula B-1 based on the component (B) is about 10% to 40%, preferably 15% to 35%. The compound of formula B-1 mainly provides the components (B) hardness, heat resistance, and resistance to acid/alkali salt corrosion.

Formula B-2 can be expressed as butadiene or its derivatives, for example, poly (E)-but-2-ene or poly (Z)-but-2-ene, etc. The weight percentage of the compound of formula B-2 based on the component (B) is about 10% to 20%, preferably 5% to 25%. The compound of formula B-2 mainly provides the components (B) low-temperature ductility and impact resistance.

Formula B-3 can be expressed as styrene or its derivatives, for example, 1-methyl-4-vinylbenzene, 1-bromo-4-(prop-1-en-2-yl)benzene, or 3,3-dimethylbut-1-en-2-yl)benzene, etc. The weight percentage of the compound of formula B-3 based on the component (B) is about 40% to 60%, preferably 40% to 55%. The compound of formula B-3 mainly provides the components (B) rigidity, surface finish, and fluidity for processing.

In Example 1, acrylonitrile of formula B-1, butadiene of formula B-2, and styrene of formula B-3 are subject to polymerization to form the second resin of the component (B).

The phosphorus-containing flame retardant of the component (C) in Example 1 has a structure as shown in formula 2 below:

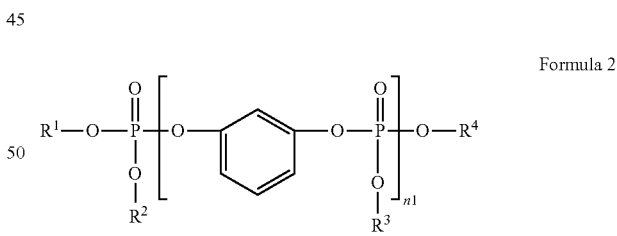

Formula 2 where n1 is any numeral of 1-5; each of $R^1$, $R^2$, $R^3$, $R^4$ is selected from alkyl of C1-C4, aryl, or naphthyl. Formula 2 shows the double bond P=O. In another embodiment, n1 is selected to be 3 and all $R^1$, $R^2$, $R^3$, $R^4$ is selected to be methyl. On the other hand, the phosphorus-containing flame retardant of the component (C) is a derivative of formula 2 such as 1,3-phenylene dip-tolyl diphosphate or 1,3-phenylene tetranaphthalen-1-yl diphosphate etc. Its structure is shown as follows.

RDP

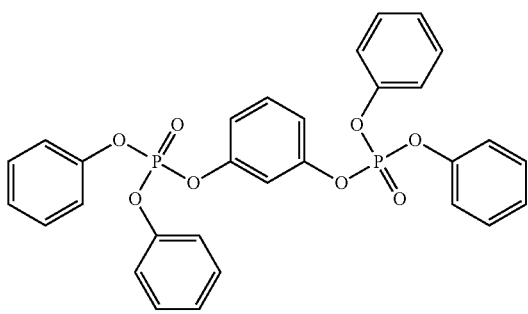

1,3-phenylene dip-tolyl diphosphate

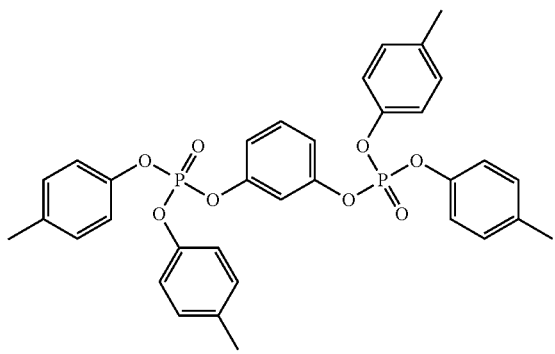

1,3-phenylene tetranaphthalen-1-yl diphosphate

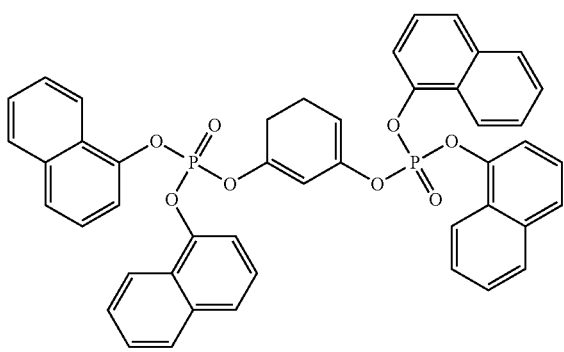

Component (D): additives, including about 5 to 37 weight percentage of glass fiber which mainly enhances material strength such as impact resistance and so on. On the other hand, the additive of the component (D) can further include antioxidants, and plasticizers. The amount of the antioxidants is about 0.1% to 0.3% so as to prevent aging or pyrolysis of the composite material. The amount of the plasticizers is about 0.1% to 0.3% so as to enhance the plasticity of the material, moldability and machinability.

In this embodiment, three flame retardants of formula 2 in different proportion are used. The ratio of the component (A) and component (B) is 70/30. The amount of the component (D) is 10%. The ratio of the three flame retardants (i.e. the component (C)) are respectively 10%, 15%, and 20%. The above materials are cut into 1 mm thick specimens, and then subject to UL-94 flame test to illustrate the fireproof effects. Please refer to Table 1, which shows the standards of UL 94 test results at all levels.

TABLE 1

| test standards | UL-94 V0 | UL-94 V1 | UL-94 V2 |
| --- | --- | --- | --- |
| Spontaneous combustion time for each specimen (t1 or t2) | ≦10 sec | ≦30 sec | ≦30 sec |
| Sum of spontaneous combustion time for all five specimen (t1 + t2) | ≦50 sec | ≦250 sec | ≦2500 sec |
| Second-time spontaneous combustion time(t2) for each specimen plus duration(t3) of sparkling | ≦30 sec | ≦60 sec | ≦60 sec |
| Specimen dropping or burning upon a clipper | NO | NO | NO |
| Is ash cottonized? | NO | NO | YES |

Table 2 through able 4 show test results of flame retardance according UL-94 on 1 mm thick specimens containing 10%, 15% and 20% of flame retardants of formula 2.

TABLE 2

| 10% flame retardant of formula 2 | t1 (sec) | t2 (see) | t3 (sec) |
| --- | --- | --- | --- |
| Specimen A | 3.4 | 1.8 | 0 |
| Specimen B | 2 | 6.5 | 0 |
| Specimen C | 2.1 | 1.8 | 0 |
| Specimen D | 2.3 | 2.3 | 0 |
| Specimen E | 1.8 | 1.1 | 0 |
| Total time | | 24 | |
| specification | | UL-94 V0 | |

TABLE 3

| 15% flame retardant of formula 2 | t1 (sec) | t2 (sec) | t3 (sec) |
| --- | --- | --- | --- |
| Specimen A | 2.3 | 1.9 | 0 |
| Specimen B | 1.7 | 2.3 | 0 |
| Specimen C | 5.1 | 1.1 | 0 |
| Specimen D | 3.4 | 6.4 | 0 |
| Specimen E | 2.3 | 1.5 | 0 |
| Total time | | 28 | |
| Specification | | UL-94 V0 | |

TABLE 4

| 20% flame retardant of formula 2 | t1 (sec) | t2 (sec) | t3 (sec) |
|---|---|---|---|
| Specimen A | 1.7 | 1.6 | 0 |
| Specimen B | 3.0 | 2.5 | 0 |
| Specimen C | 2.4 | 1.7 | 0 |
| Specimen D | 3.4 | 2.9 | 0 |
| Specimen E | 1.8 | 2.9 | 0 |
| Total time | | 23.9 | |
| Specification | | UL-94 V0 | |

In Table 2 through Table 4, the amount of the flame retardants is in the range of 10% to 20%. Table 5 shows the range of amount for each component used in Example 1, complying with the requirements of specification UL-94 V0.

TABLE 5

| Component (A): PC | | 60% to 80% |
|---|---|---|
| Component (B): ABS | | 15% to 35% |
| Component (C): flame retardant of formula 2 | | 10% to 20% |
| Component (D): | glass fiber | 5% to 37% |
| additive | antioxidant | 0.1% to 0.3% |
| | plasticizer | 0.1% to 0.3% |

On the other hand, Example 1 of the this invention is further subject to Experiments in which the amount of the flame retardant is 10% and the amounts of the glass fiber are 10% and 20%, as shown in Table 6. Specimens made of the materials according to Table 6 and commercially available specimens (Comparative Example), all of which has thickness of 1 mm, are subject to mechanical property test and UL-94 flame test. The results are shown in Table 7.

TABLE 6

| | Experiment 1 | Experiment 2 |
|---|---|---|
| Component (A): PC | 56% | 49% |
| Component (B): ABS | 24% | 21% |
| Component (C): flame retardant of formula 2 | 10% | 10% |
| Glass fiber | 10% | 20% |
| Antioxidant | 0.2% | 0.2% |
| Plasticizer | 0.2% | 0.2% |
| Total content of phosphorus (%) | 1.7% | 1.7% |

TABLE 7

| | Experiment 1 | Experiment 2 | Comparative Example |
|---|---|---|---|
| Maximum stress (Kgf/cm$^2$) | 511 | 551 | 500 |
| Failure stress (Kgf/cm$^2$) | 862 | 979 | 800 |
| Elastic stress (Kgf/cm$^2$) | 36K | 52K | 25K |
| Shrinkage (%) | 0.2 | 0.22 | 0.4-0.6 |
| Heat-resistance specification | UL-94 V0 | UL-94 V0 | UL-94 V2 |

According to the experimental data of Table 7, the commercially available product (i.e. Comparative Example) has about 20% of phosphorus content and its rating regarding to flame retardance only meets UL-94 V2 specification. However, the composite materials of this invention has about approximately between 1.5 to 2.0 percent of phosphorus in total (Experiment 1 and 2 in Table 6 are about 1.7%), but its rating regarding to flame retardance can be significantly improved to UL-94 V0 specification. In other words, the amount of the flame retardant in the composite material of the present invention is low (about one-tenth of the commercially available products) while contribute to reach a higher level of fireproof effect/flame retardance. Furthermore, the invention can dramatically reduce the production cost, while enhance the effect of composite materials in term of fireproof effect. Calculation on total phosphorus content of Experiments 1 and 2 in Table 6 are explained as follows. In formula 2, n1 is set to 3, $R^1$, $R^2$, $R^3$, $R^4$ all are methyl. According to the molecular weight of each element in the formula (such as the molecular weight of hydrogen is 1, carbon is 12, oxygen is 16, and phosphorous is 31) and the number of contained elements, the ratio of phosphorus is calculated to be 124/718, that is about 17%. The ratio of flame retardant of formula 2 based on the resin is 10%. The total phosphorus content in the material is 1.7%.

On the other hand, from the shrinkage data in Table 7, it's evident that the shrinkage rate of the commercially available products is 2 to 3 times of the composite material of this invention, indicating that the commercially available product has poor moldability and tends to deform during molding. Moreover, mechanical properties such as the maximum stress, failure stress and elastic stress prove the composite material of the present invention is superior to the commercially available products.

Example 2

Another flame retardant having P=X double bond is used in this Example. In this Example, the component (A) is a first resin (i.e., polycarbonate resin), the component (B) is a second resin (i.e., acrylonitrile butadiene styrene copolymer resin), and the component (D) is an additive, all of which can be referred to Example 1 and will skip the detailed description here. The component (C) of Example 2 is a phosphorous-containing flame retardant has the following structure:

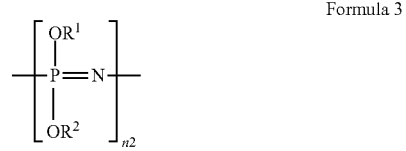

Formula 3 where n2 is any numeral of 1 to 10; R1 and R2 are respectively selected from alkyl of C1 to C4, cycloalkyl of C6 to C8 or, aryl. The formula 3 shows the double bond P=N. The phosphorous-containing flame retardant of the component (C) can be any derivatives of formula 3 such as diphenyl phosphonimidate having the following structure:

diphenyl phosphonimidate

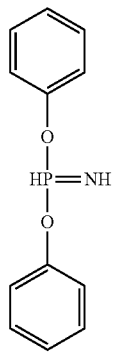

In this Example 2, two compounds of formula 3 are proposed. The ratio of the component (A) and the component (B) is 70/30. The amount of the component (D) is 10%. The ratio of the flame retardants of formula 3, i.e., the component (C) is 10% and 15%. The above material is cut into 1 mm thick specimens which are then subject to UL-94 flame retardance test to demonstrate the fireproof/flame retardance effect of the composite material according to the invention. The description of UL-94 flame retardance test can be referred to the above Table 1 and the details thereof.

Table 8 and Table 9 show results of UL-94 flame retardance test on the 1 mm thick specimens containing 10% and 15% flame retardant of formula 3.

TABLE 8

| 10% of flame retardant of formula 3 | t1 (sec) | t2 (sec) | t3 (sec) |
|---|---|---|---|
| Specimen A | 13.5 | 1 | 0 |
| Specimen B | 13.5 | 6.4 | 0 |
| Specimen C | 14.6 | 2 | 0 |
| Specimen D | 13.7 | 5.7 | 0 |
| Specimen E | 9.6 | 1.4 | 0 |
| Total time | | 81.4 | |
| Specification | | UL-94 V1 | |

TABLE 9

| 15% of flame retardant of formula 3 | t1 (sec) | t2 (sec) | t3 (sec) |
|---|---|---|---|
| Specimen A | 6.7 | 5.2 | 0 |
| Specimen B | 6.2 | 2.3 | 0 |
| Specimen C | 2.4 | 6 | 0 |
| Specimen D | 5.1 | 6.4 | 0 |
| Specimen E | 6.8 | 2.6 | 0 |
| Total time | | 49 | |
| Specification | | UL-94 V0 | |

According to the results of Table 8 and Table 9, the amount of the flame retardant of formula 3 can be 12.5% to 15%. Table 10 shows the preferred ratio range for each component of the composite material in Example 2, with complying with the requirement of specification UL-94 V0.

TABLE 10

| Component (A): PC | | 60% to 80% |
|---|---|---|
| Component (B): ABS | | 15% to 35% |
| Component (C): flame retardant of formula 3 | | 12.5% to 15% |
| Component (D): additive | glass fiber | 5% to 37% |
| | antioxidant | 0.1% to 0.3% |
| | plasticizer | 0.1% to 0.3% |

On the other hand, Example 2 of the this invention is further subject to two experiments in which the amount of the flame retardant for formula 3 is 12.5% and the amounts of the glass fiber in the component (D) are 10% and 20%, as shown in Table 11. Specimens made of materials according to Table 11 and commercially available specimens (Comparative Example), all of which has thickness of 1 mm, are subject to mechanical property test and UL-94 flame retardance test. The results are shown in Table 12.

TABLE 11

| | Experiment 1 | Experiment 2 |
|---|---|---|
| Component (A): PC | 55% | 47% |
| Component (B): ABS | 23% | 20% |
| Component (C): flame retardant of formula 3 | 12.5% | 12.5% |
| Glass fiber | 10% | 20% |
| Antioxidant | 0.2% | 0.2% |
| Plasticizer | 0.2% | 0.2% |
| Total content of phosphorus (%) | 1.7% | 1.7% |

TABLE 12

| | Experiment 1 | Experiment 2 | Comparative Example |
|---|---|---|---|
| Maximum stress (Kgf/cm$^2$) | 554 | 465 | 500 |
| Failure stress (Kgf/cm$^2$) | 980 | 937 | 800 |
| Elastic stress (Kgf/cm$^2$) | 35K | 47K | 25K |
| Shrinkage (%) | 0.37 | 0.23 | 0.4-0.6 |
| Heat-resistance specification | UL-94 V0 | UL-94 V0 | UL-94 V2 |

According to the experimental data of Table 12, the commercially available product (i.e. Comparative Example) has about 20% of phosphorus content and its rating regarding to flame retardance only meets UL-94 V2 specification. However, the composite materials of this invention has about 1.5 to 2.0 percent of phosphorus in total (Experiment 1 and 2 in Table 11 are about 1.7%), but its rating regarding to flame retardance can be significantly improved to UL-94 V0 specification. In other words, the amount of the flame retardant in the composite material of the present invention is low (about one-tenth of the commercially available products) while contribute to reach a higher level of fireproof effect/flame retardance. Furthermore, the invention can dramatically reduce the production cost, while enhance the effect of composite materials in term of fireproof effect. Calculation on total phosphorus content of Experiments 1 and 2 in Table 11 are explained as follows. In formula 3, n2 is set to 3, $R^1$, $R^2$ both are benzene. According to the molecular weight of each element in the formula (such as the molecular weight of hydrogen is 1, carbon is 12, oxygen is 16, and phosphorous is 31) and the number of contained elements, the ratio of phosphorus is calculated to be 93/693, that is about 13.4%. The ratio of flame retardant of formula 3 based on the resin is 12.5%. The total phosphorus content in the material is 1.7%.

On the other hand, from the shrinkage data in Table 12, it's evident that the shrinkage rate of the commercially available product is 2 times of the composite material of this invention, indicating that the commercially available products has poor moldability and tends to deform during molding. Moreover, mechanical properties such as the maximum stress, failure stress and elastic stress prove the composite material of the present invention is superior to the commercially available products.

On the other hand, the phosphorus-containing flame having a P=X double bond retardant forms phosphoric acid after heating. The polyphosphoric acid after polymerization of phosphoric acid can be reacted with oxygen (O) or hydroxyl (OH) in the plastic material to form phosphorus oxides. The above phosphorus oxides constitute a covered structure to prevent the combustion reaction. In other words, the plastic material may be subject to esterified dehydration to form a carbon layer, which provides fireproof/flame retardant effect. The above reaction mechanism (take the phosphorus-containing flame retardant in Example 2 as an example) can be represented by the following reaction scheme:

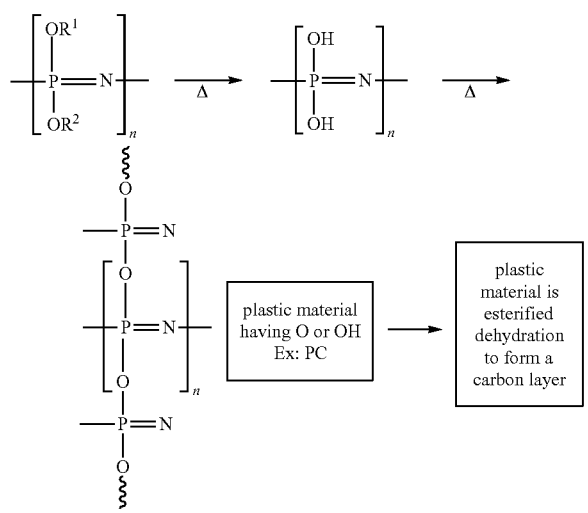

In light of the above, the invention has the following advantages.

This invention uses a flame retardant having a P=X double bond, which can be compounds of formula 2 or derivatives thereof, or compounds of formula 3 or their derivatives. The above flame retardant can be added in the PC/ABS composite material to improve the heat resistance and fire resistance of PC/ABS composite material.

In addition, only a small amount of the flame retardant is needed to add into the composite material of the invention to obtain a very good fire protection effect. For example, the Examples of this invention, only about 1.5% to 2.0% of the total amount of phosphorus in the composite material is needed to achieve UL-94 V0 specification, significantly saving production cost.

Moreover, the present invention further adds glass fibers having appropriate fiber diameter and being subject to appropriate surface treatment to maintain the mechanical strength and the anti-aging property of the PC/ABS composite material.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A flame retarding composite material, consisting of:
component (A): a first resin which is polycarbonate (PC) resin;
component (B): a second resin which is acrylonitrile butadiene styrene (ABS) resin;
component (C): a phosphorus-containing flame retardant being derivatives having the following formula 3:

Formula 3 wherein n2 is any numeral of 1 to 10;
wherein the derivative having formula 3 is diphenyl phosphonimidate; and
component (D): an additive, including glass fibers,
wherein the amount of polycarbonate resin based on the composite material is 60 wt % to 80 wt %, the amount of acrylonitrile butadiene styrene resin based on the composite material is 15 wt % to 35 wt %, the amount of the phosphorus-containing flame retardant is 10 wt % to 20 wt %, and the amount of glass fibers based on the composite material is 5 wt % to 37 wt %; all the components are subject to distributive mixing to form the target composite material.

2. The flame retarding composite material of claim 1, wherein the total phosphorus content in the flame retarding composite material is 1.5 wt % to 2.0 wt %.

3. The flame retarding composite material of claim 1, wherein the first resin of the component (A) is compounds or derivatives having the following formula 4:

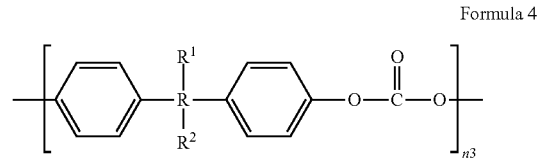

Formula 4 wherein n3 is 50 to 500;
R is selected from the group consisting of C1-C4, C1-C7 alkenyl, C6-C8 cycloalkyl, C6-C12 phenyl, nitrogen, and sulfur;
each of R1, R2 is respectively selected from the group consisting of hydrogen, C1-C5 straight-chain alkyl, C1-C5 branched-chain alkyl, and C6-C12 phenyl.

4. The flame retarding composite material of claim 3, wherein the first resin of the component (A) is straight-chain or branched polymers.

5. The flame retarding composite material of claim 1, wherein the second resin of the component (B) is selected from the group consisting of compounds or derivatives having formula B-1, B-2, B-3:

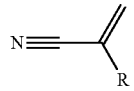
(Formula B-1)

wherein R is hydrogen or C1-C4 alkyl;

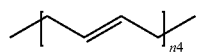
(Formula B-2)

wherein n4 is 250 to 3300;

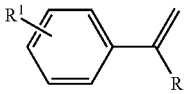
(Formula B-3)

wherein R is hydrogen or C1-C7 alkyl;
$R^1$ is methyl or halogen.

6. The flame retarding composite material of claim 5, wherein the amount of compounds or derivatives having formula B-1 based on the component (B) is 15 wt % to 35 wt %; the amount of compounds or derivatives having formula B-2 based on the component (B) is 5 wt % to 25 wt %; the amount of compounds or derivatives having formula B-3 based on the component (B) is 40 wt % to 70 wt %.

\* \* \* \* \*